(No Model.)

W. H. HEFNER.
WHEEL TIRE.

No. 604,529. Patented May 24, 1898.

Witnesses
Franck L. Ourand
George J. Weber

Inventor
William H. Hefner,
per E. W. Bradford
Attorney

THE NORRIS PETERS CO., PHOTO-LITHO., WASHINGTON, D. C.

UNITED STATES PATENT OFFICE.

WILLIAM HORACE HEFNER, OF ROCK HILL, SOUTH CAROLINA.

WHEEL-TIRE.

SPECIFICATION forming part of Letters Patent No. 604,529, dated May 24, 1898.

Application filed December 1, 1897. Serial No. 660,382. (No model.)

*To all whom it may concern:*

Be it known that I, WILLIAM HORACE HEFNER, a citizen of the United States, residing at Rock Hill, in the county of York and State of South Carolina, have invented certain new and useful Improvements in Wheel-Tires; and I do declare the following to be a full, clear, and exact description of the invention, such as will enable others skilled in the art to which it appertains to make and use the same, reference being had to the accompanying drawings, and to the letters of reference marked thereon, which form a part of this specification.

The object of my said invention is to provide a tire for vehicle-wheels, especially for bicycles, which shall possess all the advantages of a pneumatic tire as to resiliency and at the same time all the wearing and non-puncturable qualities of a solid or hard tire; and it consists in forming the main face or tread of said tire of practically a solid or hard material and interposing a pneumatic cushion between the same and the rim of the wheel, as will be hereinafter more fully described and claimed.

Figure 1:
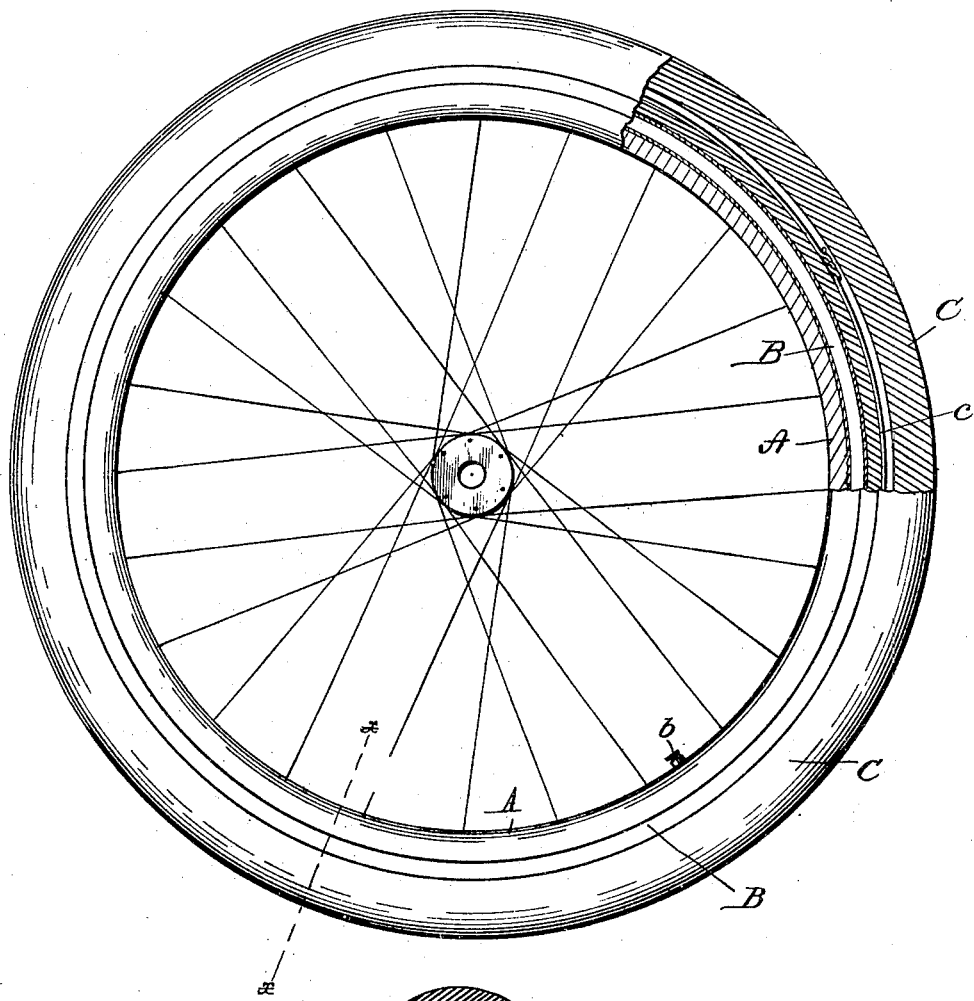
Figure 2:
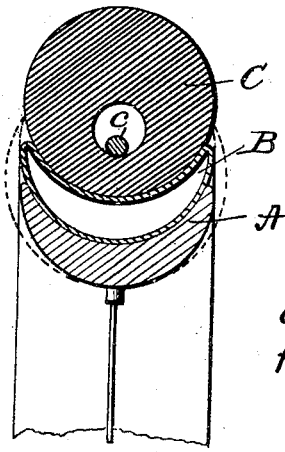

Referring to the accompanying drawings, which are made a part hereof and on which similar letters of reference indicate similar parts, Figure 1 is a side elevation of a bicycle-wheel provided with a tire of my improved construction, a portion of said tire being shown in longitudinal section to show the relation of the parts more clearly; and Fig. 2 is a cross-section through the same on the dotted line $x$ $x$ in Fig. 1, a modified form being indicated by dotted lines.

In said drawings the portions marked A represent the wheel-rim, B the pneumatic tube or cushion, and C the outer tire. Said rim A is or may be the rim of any wheel on which such a tire is suitable, an ordinary bicycle construction being shown, it being with such wheels that the tire is particularly adapted for use.

The pneumatic tube B is in all material respects substantially the same as an ordinary single-tube pneumatic tire, and such tires may be used instead of a tube made especially for the purpose whenever convenient or desired. It is mounted on the rim in the usual way and provided with the ordinary connection and valve $b$ for the pump by which it is inflated.

The main part C of the tire, which constitutes the tread and takes all the wear, is practically a solid ring of the size required for the purpose. It is preferably of rubber and has an annular perforation on the inner side of its center, through which a wire band $c$ is run, which serves to hold it from expanding or stretching under the pneumatic pressure when the tube B is pumped up. Instead of rubber other suitable material not capable of injury by puncture, and possessed of requisite durability, may of course be used, and the degree of solidity, diameter, &c., may be varied as found suitable for various uses, the construction illustrated and the material described being such as is deemed most desirable for the particular use as a bicycle-tire.

In practice the tube B is mounted on the rim in the same manner as is an ordinary pneumatic tire. The tire proper, C, first rendered non-elastic by the metal band or ring $c$, is then put in place, and the tube B is then inflated until the pressure is sufficient to clamp said tire securely in place. When inflated, the tube conforms, of course, to the form of the rim on the one side and to that of the tire on the other, its edges extending up on each side of said tire and forming a suitable seat. As the ring or band $c$ will not allow any expansion it will be seen that the pneumatic pressure will operate to hold said tire firmly and rigidly in place. By this arrangement all the wear and cuts and punctures come upon the tire C, which is not injured thereby, and at the same time the resiliency of a pneumatic tire is secured.

As indicated by the dotted lines in Fig. 2, the rim A may be made with its sides extending up around the pneumatic tube and against the sides of the solid tire, if found necessary or desirable. As will be readily understood, the solid and pneumatic parts may be vulcanized together, if desired, or formed in one piece, and other such modifications made without departing from my said invention.

Having thus fully described my said invention, what I claim as new, and desire to secure by Letters Patent, is—

A wheel-tire consisting of a pneumatic tube or sack mounted on the rim, a cushion-tire with a central perforation mounted on said pneumatic tube or sack, and a solid non-expansible metal ring mounted in said perforation in said cushion, whereby it is prevented from expanding under the pressure from the pneumatic tube, when pumped up, said pneumatic tube or sack being adapted to partially embrace said cushion-tire, and thus hold it in place, substantially as set forth.

In testimony whereof I affix my signature in presence of two witnesses.

WILLIAM HORACE HEFNER.

Witnesses:
ED. E. POOG,
P. C. POOG.